US011219288B2

(12) United States Patent
Glass

(10) Patent No.: US 11,219,288 B2
(45) Date of Patent: Jan. 11, 2022

(54) GIFT CARD BOX WITH SLANTED TRAY AND SLIT

(71) Applicant: e2interactive, Inc., Atlanta, GA (US)

(72) Inventor: Brett R. Glass, Kansas City, MO (US)

(73) Assignee: E2INTERACTIVE, INC., Atlanta, GA (US)

( * ) Notice: Subject to any disclaimer, the term of this patent is extended or adjusted under 35 U.S.C. 154(b) by 61 days.

(21) Appl. No.: 15/656,618

(22) Filed: Jul. 21, 2017

(65) Prior Publication Data

US 2017/0318929 A1  Nov. 9, 2017

Related U.S. Application Data

(60) Continuation-in-part of application No. 15/431,535, filed on Feb. 13, 2017, now Pat. No. 11,111,065, (Continued)

(51) Int. Cl.
*A45C 11/18* (2006.01)
*G07F 17/00* (2006.01)
(Continued)

(52) U.S. Cl.
CPC ............ *A45C 11/18* (2013.01); *B65D 27/00* (2013.01); *B65D 27/04* (2013.01); *B65D 27/22* (2013.01); *B65D 73/0078* (2013.01); *G06Q 20/387* (2013.01); *G06Q 99/00* (2013.01); *G07F 17/00* (2013.01); *B65D 2203/00* (2013.01); *G06Q 20/354* (2013.01)

(58) Field of Classification Search
CPC ........ A45C 11/18; B65D 27/00; B65D 27/04; B65D 27/22; B65D 2203/00; G06Q 20/387; G07F 17/00

USPC .......................................................... 206/39
See application file for complete search history.

(56) References Cited

U.S. PATENT DOCUMENTS 1,059,187 A * 4/1913 McKee .................. A45C 11/18
                                                   206/39
2,792,933 A * 5/1957 Butlin .................... B65D 83/10
                                                  206/359
(Continued)

FOREIGN PATENT DOCUMENTS

EP          0950968 A4    5/2004
EP          1519332 A1    3/2005
(Continued)

OTHER PUBLICATIONS

Eazel, William, "Paypal intros SMS Payments," http://www.v3co.uk/articles/print/2152694, vnunet.com, Mar. 24, 2006, 1 page.
(Continued)

*Primary Examiner* — Chun Hoi Cheung
(74) *Attorney, Agent, or Firm* — Landmark Intellectual Property Law, PLLC; Gregory Murphy

(57) ABSTRACT

The disclosed invention relates generally to a box for receiving and holding a transaction card. In particular, the invention relates to a box that has a cutout for viewing a transaction card and a slit for receiving a transaction card. The box permits a transaction card disposed therein to be visible, scanned, accessed, or otherwise activated without removing the gift card from the box.

20 Claims, 10 Drawing Sheets

Related U.S. Application Data which is a division of application No. 14/181,668, filed on Feb. 15, 2014, now Pat. No. 9,565,911.

(60) Provisional application No. 61/765,594, filed on Feb. 15, 2013.

(51) Int. Cl.

| | | |
|---|---|---|
| *G06Q 20/38* | (2012.01) | |
| *B65D 27/00* | (2006.01) | |
| *B65D 27/22* | (2006.01) | |
| *B65D 27/04* | (2006.01) | |
| *B65D 73/00* | (2006.01) | |
| *G06Q 99/00* | (2006.01) | |
| *G06Q 20/34* | (2012.01) | |

(56) References Cited

U.S. PATENT DOCUMENTS

| | | | |
|---|---|---|---|
| 3,286,823 A * | 11/1966 | Gillespie | A45C 11/18 |
| | | | 206/39.5 |
| 3,288,350 A | 11/1966 | Kushner | |
| 4,068,213 A | 1/1978 | Nakamura et al. | |
| 4,482,802 A | 11/1984 | Aizawa et al. | |
| 4,602,712 A * | 7/1986 | Williams | A45C 11/182 |
| | | | 206/0.815 |
| 4,717,023 A * | 1/1988 | Oprean | A45C 3/02 |
| | | | 206/459.5 |
| 4,734,858 A | 3/1988 | Schlafly | |
| 4,747,049 A | 5/1988 | Richardson et al. | |
| 4,755,940 A | 7/1988 | Brachtl et al. | |
| 4,765,535 A * | 8/1988 | Michetti | B65D 5/22 |
| | | | 229/172 |
| 4,767,917 A | 8/1988 | Ushikubo | |
| 4,795,892 A | 1/1989 | Gilmore et al. | |
| 4,877,947 A | 10/1989 | Mori | |
| 4,900,904 A | 2/1990 | Wright et al. | |
| 4,908,521 A | 3/1990 | Boggan et al. | |
| 4,943,707 A | 7/1990 | Boggan | |
| 5,044,547 A * | 9/1991 | Hartman | B65D 5/248 |
| | | | 229/175 |
| 5,091,634 A | 2/1992 | Finch et al. | |
| 5,117,355 A | 5/1992 | McCarthy | |
| 5,202,826 A | 4/1993 | McCarthy | |
| 5,255,182 A | 10/1993 | Adams | |
| 5,256,863 A | 10/1993 | Ferguson et al. | |
| 5,311,424 A | 5/1994 | Mukherjee et al. | |
| 5,367,148 A | 11/1994 | Storch et al. | |
| 5,375,240 A | 12/1994 | Grundy | |
| 5,383,113 A | 1/1995 | Kight et al. | |
| 5,384,449 A | 1/1995 | Peirce | |
| 5,458,236 A * | 10/1995 | Schoettle | G11B 23/0233 |
| | | | 206/232 |
| 5,465,288 A | 11/1995 | Falvey et al. | |
| 5,477,038 A | 12/1995 | Levine et al. | |
| 5,500,513 A | 3/1996 | Langhans et al. | |
| 5,502,765 A | 3/1996 | Ishiguro et al. | |
| 5,511,114 A | 4/1996 | Stimson et al. | |
| 5,577,109 A | 11/1996 | Stimson et al. | |
| 5,581,064 A | 12/1996 | Riley et al. | |
| 5,590,038 A | 12/1996 | Pitroda | |
| 5,602,377 A | 2/1997 | Beller et al. | |
| 5,619,559 A | 4/1997 | Kennedy | |
| 5,621,201 A | 4/1997 | Langhans et al. | |
| 5,621,787 A | 4/1997 | McKoy et al. | |
| 5,644,721 A | 7/1997 | Chung et al. | |
| 5,657,389 A | 8/1997 | Houvener | |
| 5,671,279 A | 9/1997 | Elgamal | |
| 5,679,938 A | 10/1997 | Templeton et al. | |
| 5,679,940 A | 10/1997 | Templeton et al. | |
| 5,696,909 A | 12/1997 | Wallner | |
| 5,699,528 A | 12/1997 | Hogan | |
| 5,705,798 A | 1/1998 | Tarbox | |
| 5,708,780 A | 1/1998 | Levergood et al. | |

| | | |
|---|---|---|
| 5,721,768 A | 2/1998 | Stimson et al. |
| 5,721,781 A | 2/1998 | Deo et al. |
| 5,729,693 A | 3/1998 | Holda-Fleck |
| 5,732,136 A | 3/1998 | Murphree et al. |
| 5,734,719 A | 3/1998 | Tsevdos et al. |
| 5,740,915 A | 4/1998 | Williams |
| 5,754,655 A | 5/1998 | Hughes et al. |
| 5,760,381 A | 6/1998 | Stich et al. |
| 5,777,305 A | 7/1998 | Smith et al. |
| 5,799,285 A | 8/1998 | Klingman |
| 5,806,045 A | 9/1998 | Biorge et al. |
| 5,828,740 A | 10/1998 | Khuc et al. |
| 5,844,972 A | 12/1998 | Jagadish et al. |
| 5,850,217 A | 12/1998 | Cole |
| 5,857,175 A | 1/1999 | Day et al. |
| 5,873,072 A | 2/1999 | Kight et al. |
| 5,878,401 A | 3/1999 | Joseph |
| 5,884,271 A | 3/1999 | Pitroda |
| 5,889,270 A | 3/1999 | Haagen et al. |
| 5,889,863 A | 3/1999 | Weber |
| 5,897,625 A | 4/1999 | Gustin et al. |
| 5,903,633 A | 5/1999 | Lorsch |
| 5,903,830 A | 5/1999 | Joao et al. |
| 5,903,874 A | 5/1999 | Leonard et al. |
| 5,907,142 A | 5/1999 | Kelsey |
| 5,909,492 A | 6/1999 | Payne et al. |
| 5,913,210 A | 6/1999 | Call |
| 5,918,213 A | 6/1999 | Bernard et al. |
| 5,930,363 A | 7/1999 | Stanford et al. |
| 5,945,653 A | 8/1999 | Walker et al. |
| 5,950,173 A | 9/1999 | Perkowski |
| 5,953,710 A | 9/1999 | Fleming |
| 5,956,695 A | 9/1999 | Carrithers et al. |
| 5,956,700 A | 9/1999 | Landry |
| 5,968,110 A | 10/1999 | Westrope et al. |
| 5,984,508 A | 11/1999 | Hurley |
| 5,988,509 A | 11/1999 | Taskett |
| 5,991,413 A | 11/1999 | Arditti et al. |
| 5,991,748 A | 11/1999 | Taskett |
| 5,991,749 A | 11/1999 | Morrill, Jr. |
| 5,999,624 A | 12/1999 | Hopkins |
| 6,000,608 A | 12/1999 | Dorf |
| 6,012,049 A | 1/2000 | Kawan |
| 6,018,570 A | 1/2000 | Matison |
| 6,025,780 A | 2/2000 | Bowers et al. |
| 6,029,139 A | 2/2000 | Cunningham et al. |
| 6,029,141 A | 2/2000 | Bezos et al. |
| 6,029,151 A | 2/2000 | Nikander |
| 6,032,135 A | 2/2000 | Molano et al. |
| 6,032,859 A | 3/2000 | Muehlberger et al. |
| 6,039,244 A | 3/2000 | Finsterwald |
| 6,049,778 A | 4/2000 | Walker et al. |
| 6,055,511 A | 4/2000 | Luebbering et al. |
| 6,055,567 A | 4/2000 | Ganesan et al. |
| 6,058,300 A | 5/2000 | Hanson |
| 6,058,382 A | 5/2000 | Kasai et al. |
| 6,062,472 A | 5/2000 | Cheung |
| 6,070,150 A | 5/2000 | Remington et al. |
| 6,085,167 A | 7/2000 | Iguchi |
| 6,085,242 A | 7/2000 | Chandra |
| 6,088,682 A | 7/2000 | Burke |
| 6,092,053 A | 7/2000 | Boesch et al. |
| 6,098,053 A | 8/2000 | Slater |
| 6,105,008 A | 8/2000 | Davis et al. |
| 6,119,164 A | 9/2000 | Basche |
| 6,125,352 A | 9/2000 | Franklin et al. |
| 6,129,276 A | 10/2000 | Jelen et al. |
| 6,134,533 A | 10/2000 | Shell |
| 6,138,106 A | 10/2000 | Walker et al. |
| 6,138,911 A | 10/2000 | Fredregill et al. |
| 6,142,369 A | 11/2000 | Jonstromer |
| 6,148,249 A | 11/2000 | Newman |
| 6,167,387 A | 12/2000 | Lee-Wai-Yin |
| 6,169,890 B1 | 1/2001 | Vatanen |
| 6,173,272 B1 | 1/2001 | Thomas et al. |
| 6,175,823 B1 | 1/2001 | Dusen |
| 6,185,545 B1 | 2/2001 | Resnick et al. |
| 6,188,752 B1 | 2/2001 | Lesley |
| 6,219,652 B1 | 4/2001 | Carter et al. |

(56) References Cited

U.S. PATENT DOCUMENTS

| | | |
|---|---|---|
| 6,222,914 B1 | 4/2001 | McMullin |
| 6,226,364 B1 | 5/2001 | O'Neil |
| 6,240,397 B1 | 5/2001 | Sachs |
| 6,256,690 B1 | 7/2001 | Carper |
| 6,282,566 B1 | 8/2001 | Lee, Jr. et al. |
| 6,285,749 B1 | 9/2001 | Manto |
| 6,289,322 B1 | 9/2001 | Kitchen et al. |
| 6,295,522 B1 | 9/2001 | Boesch |
| 6,304,860 B1 | 10/2001 | Martin, Jr. et al. |
| 6,308,887 B1 | 10/2001 | Korman et al. |
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,317,028 B1 | 11/2001 | Valiulis |
| 6,324,525 B1 | 11/2001 | Kramer et al. |
| 6,327,577 B1 | 12/2001 | Garrison et al. |
| 6,330,544 B1 | 12/2001 | Walker et al. |
| 6,332,135 B1 | 12/2001 | Conklin et al. |
| 6,333,976 B2 | 12/2001 | Lesley |
| 6,334,116 B1 | 12/2001 | Ganesan et al. |
| 6,360,254 B1 | 3/2002 | Linden et al. |
| 6,363,362 B1 | 3/2002 | Burfield et al. |
| 6,363,364 B1 | 3/2002 | Nel |
| 6,366,893 B2 | 4/2002 | Hannula et al. |
| 6,375,073 B1 | 4/2002 | Aebi et al. |
| 6,422,462 B1 | 7/2002 | Cohen |
| 6,424,706 B1 | 7/2002 | Katz et al. |
| 6,434,238 B1 | 8/2002 | Chaum et al. |
| 6,442,532 B1 | 8/2002 | Kawan |
| 6,467,684 B2 | 10/2002 | Fite et al. |
| 6,473,500 B1 | 10/2002 | Risafi et al. |
| 6,473,739 B1 | 10/2002 | Showghi et al. |
| 6,494,367 B1 | 12/2002 | Zacharias |
| 6,502,745 B1 | 1/2003 | Stimson et al. |
| 6,507,823 B1 | 1/2003 | Nel |
| 6,529,956 B1 | 3/2003 | Smith et al. |
| 6,536,659 B1 | 3/2003 | Hauser et al. |
| 6,542,933 B1 | 4/2003 | Durst, Jr. et al. |
| 6,550,672 B1 | 4/2003 | Tracy et al. |
| 6,575,361 B1 | 6/2003 | Graves et al. |
| 6,581,827 B2 | 6/2003 | Welton |
| 6,591,098 B1 | 7/2003 | Shieh et al. |
| 6,594,640 B1 | 7/2003 | Postrel |
| 6,594,644 B1 | 7/2003 | Dusen |
| 6,609,113 B1 | 8/2003 | O'Leary et al. |
| 6,615,189 B1 | 9/2003 | Phillips et al. |
| 6,615,190 B1 | 9/2003 | Slater |
| 6,622,015 B1 | 9/2003 | Himmel et al. |
| 6,636,833 B1 | 10/2003 | Flitcroft et al. |
| 6,648,222 B2 | 11/2003 | McDonald et al. |
| 6,651,885 B1 | 11/2003 | Arias |
| 6,659,259 B2 | 12/2003 | Knox et al. |
| 6,678,664 B1 | 1/2004 | Ganesan |
| 6,684,269 B2 | 1/2004 | Wagner |
| 6,705,520 B1 | 3/2004 | Pitroda et al. |
| 6,745,022 B2 | 6/2004 | Knox |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,827,260 B2 | 12/2004 | Stoutenburg et al. |
| 6,829,596 B1 | 12/2004 | Frazee |
| 6,836,765 B1 | 12/2004 | Sussman |
| 6,836,962 B2 | 1/2005 | Khandros et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B2 | 2/2005 | Ganesan et al. |
| 6,868,391 B1 | 3/2005 | Hultgren |
| 6,882,984 B1 | 4/2005 | Boyle et al. |
| 6,915,277 B1 | 7/2005 | Manchester et al. |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,961,412 B2 | 11/2005 | Ruckart et al. |
| 6,965,866 B2 | 11/2005 | Klein |
| 6,975,937 B1 | 12/2005 | Kantarjiev et al. |
| 6,988,657 B1 | 1/2006 | Singer et al. |
| 6,993,510 B2 | 1/2006 | Guy et al. |
| 7,014,107 B2 | 3/2006 | Singer et al. |
| 7,016,863 B1 | 3/2006 | Kamakura et al. |
| 7,024,174 B2 | 4/2006 | Nagy et al. |
| 7,024,396 B2 | 4/2006 | Woodward |
| 7,054,842 B2 | 5/2006 | James et al. |
| 7,069,248 B2 | 6/2006 | Huber |
| 7,072,854 B2 | 7/2006 | Loeser |
| 7,072,864 B2 | 7/2006 | Brake, Jr. et al. |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,131,582 B2 | 11/2006 | Welton |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,194,438 B2 | 3/2007 | Sovio et al. |
| 7,209,889 B1 | 4/2007 | Whitfield |
| 7,209,890 B1 | 4/2007 | Peon et al. |
| 7,216,092 B1 | 5/2007 | Weber et al. |
| 7,222,101 B2 | 5/2007 | Bishop et al. |
| 7,229,006 B2 | 6/2007 | Babbi et al. |
| 7,229,014 B1 | 6/2007 | Snyder |
| 7,243,839 B2 | 7/2007 | Beck et al. |
| 7,249,054 B2 | 7/2007 | Keil |
| 7,249,097 B2 | 7/2007 | Hutchison et al. |
| 7,269,256 B2 | 9/2007 | Rosen |
| 7,292,998 B2 | 11/2007 | Graves et al. |
| 7,316,350 B2 | 1/2008 | Algiene |
| 7,328,190 B2 | 2/2008 | Smith et al. |
| 7,333,955 B2 | 2/2008 | Graves et al. |
| 7,356,327 B2 | 4/2008 | Cai et al. |
| 7,363,265 B2 | 4/2008 | Horgan |
| 7,370,012 B2 | 5/2008 | Karns et al. |
| 7,376,431 B2 | 5/2008 | Niedermeyer |
| 7,383,226 B2 | 6/2008 | Kight et al. |
| 7,398,248 B2 | 7/2008 | Phillips et al. |
| 7,400,883 B2 | 7/2008 | Rivers et al. |
| 7,415,617 B2 | 8/2008 | Ginter et al. |
| 7,437,328 B2 | 10/2008 | Graves et al. |
| 7,494,417 B2 | 2/2009 | Walker et al. |
| 7,519,543 B2 | 4/2009 | Ota et al. |
| 7,536,349 B1 | 5/2009 | Mik et al. |
| 7,566,000 B2 | 7/2009 | Agostino et al. |
| 7,590,557 B2 | 9/2009 | Harrison et al. |
| 7,631,803 B2 | 12/2009 | Peyret et al. |
| 7,650,308 B2 | 1/2010 | Nguyen et al. |
| 7,702,542 B2 | 4/2010 | Aslanian, Jr. |
| 7,711,598 B2 | 5/2010 | Perkowski |
| 7,725,326 B1 | 5/2010 | Tracy et al. |
| 7,735,724 B2 | 6/2010 | Fujita et al. |
| 7,757,944 B2 | 7/2010 | Cline et al. |
| 7,774,209 B2 | 8/2010 | James et al. |
| 7,840,437 B2 | 11/2010 | Lewis |
| 7,848,948 B2 | 12/2010 | Perkowski et al. |
| 7,866,548 B2 | 1/2011 | Reed et al. |
| 7,904,333 B1 | 3/2011 | Perkowski |
| 7,905,399 B2 | 3/2011 | Barnes et al. |
| 7,917,386 B2 | 3/2011 | Christensen |
| 7,940,333 B2 | 5/2011 | Suzuki |
| 7,941,373 B1 | 5/2011 | Chang et al. |
| 7,959,076 B1 | 6/2011 | Hopkins, III |
| 8,046,268 B2 | 10/2011 | Hunt |
| 8,060,413 B2 | 11/2011 | Castell et al. |
| 8,103,520 B2 | 1/2012 | Mueller et al. |
| 8,109,436 B1 | 2/2012 | Hopkins, III |

(56) References Cited

U.S. PATENT DOCUMENTS

| | | | |
|---|---|---|---|
| 8,195,568 B2 | 6/2012 | Singhal | |
| 8,332,323 B2 | 12/2012 | Stals et al. | |
| 8,355,982 B2 | 1/2013 | Hazel et al. | |
| 8,396,758 B2 | 3/2013 | Paradise et al. | |
| 8,474,619 B1 * | 7/2013 | Chrisman | B65D 5/5213 |
| | | | 206/449 |
| 8,509,814 B1 | 8/2013 | Parker | |
| 8,577,735 B2 | 11/2013 | Wilen et al. | |
| 8,636,203 B1 | 1/2014 | Patterson et al. | |
| 8,662,387 B1 | 3/2014 | Geller et al. | |
| 8,751,298 B1 | 6/2014 | Giordano et al. | |
| 8,768,834 B2 | 7/2014 | Zacarias et al. | |
| 9,098,190 B2 | 8/2015 | Zhou et al. | |
| 9,483,786 B2 | 11/2016 | Glass et al. | |
| 9,672,687 B2 | 6/2017 | Cage et al. | |
| 2001/0001321 A1 | 5/2001 | Resnick et al. | |
| 2001/0001856 A1 | 5/2001 | Gould et al. | |
| 2001/0005840 A1 | 6/2001 | Verkama | |
| 2001/0007983 A1 | 7/2001 | Lee | |
| 2001/0011248 A1 | 8/2001 | Himmel et al. | |
| 2001/0032878 A1 | 10/2001 | Tsiounis et al. | |
| 2001/0034707 A1 | 10/2001 | Sakaguchi | |
| 2001/0037264 A1 | 11/2001 | Husemann et al. | |
| 2001/0042784 A1 | 11/2001 | Fite et al. | |
| 2001/0044776 A1 | 11/2001 | Kight et al. | |
| 2001/0056410 A1 | 12/2001 | Ishigaki | |
| 2002/0002535 A1 | 1/2002 | Kitchen et al. | |
| 2002/0010627 A1 | 1/2002 | Lerat | |
| 2002/0010677 A1 | 1/2002 | Kitchen et al. | |
| 2002/0013768 A1 | 1/2002 | Ganesan | |
| 2002/0019809 A1 | 2/2002 | Kitchen et al. | |
| 2002/0022472 A1 | 2/2002 | Watler et al. | |
| 2002/0046165 A1 | 4/2002 | Kitchen et al. | |
| 2002/0046166 A1 | 4/2002 | Kitchen et al. | |
| 2002/0046167 A1 | 4/2002 | Kitchen et al. | |
| 2002/0046168 A1 | 4/2002 | Kitchen et al. | |
| 2002/0049672 A1 | 4/2002 | Kitchen et al. | |
| 2002/0052840 A1 | 5/2002 | Kitchen et al. | |
| 2002/0052841 A1 | 5/2002 | Guthrie et al. | |
| 2002/0060243 A1 | 5/2002 | Janiak et al. | |
| 2002/0062249 A1 | 5/2002 | Iannacci | |
| 2002/0062282 A1 | 5/2002 | Kight et al. | |
| 2002/0065713 A1 | 5/2002 | Awada et al. | |
| 2002/0065773 A1 | 5/2002 | Kight et al. | |
| 2002/0065774 A1 | 5/2002 | Young et al. | |
| 2002/0077076 A1 | 6/2002 | Suryanarayana et al. | |
| 2002/0077993 A1 | 6/2002 | Immonen et al. | |
| 2002/0088855 A1 | 7/2002 | Hodes | |
| 2002/0091573 A1 | 7/2002 | Hodes | |
| 2002/0101966 A1 | 8/2002 | Nelson | |
| 2002/0107791 A1 | 8/2002 | Nobrega et al. | |
| 2002/0111906 A1 | 8/2002 | Garrison et al. | |
| 2002/0115424 A1 | 8/2002 | Bagoren et al. | |
| 2002/0116329 A1 | 8/2002 | Serbetcioglu et al. | |
| 2002/0119767 A1 | 8/2002 | Fieldhouse et al. | |
| 2002/0120571 A1 | 8/2002 | Maung et al. | |
| 2002/0128968 A1 | 9/2002 | Kitchen et al. | |
| 2002/0138450 A1 | 9/2002 | Kremer | |
| 2002/0138573 A1 | 9/2002 | Saguy | |
| 2002/0152123 A1 | 10/2002 | Giordano et al. | |
| 2002/0152160 A1 | 10/2002 | Allen-Rouman et al. | |
| 2002/0152179 A1 | 10/2002 | Racov | |
| 2002/0153414 A1 | 10/2002 | Stoutenburg et al. | |
| 2002/0161631 A1 | 10/2002 | Banerjee et al. | |
| 2002/0169713 A1 | 11/2002 | Chang et al. | |
| 2002/0178062 A1 | 11/2002 | Wright et al. | |
| 2002/0190123 A1 | 12/2002 | Anvekar et al. | |
| 2002/0198722 A1 | 12/2002 | Yuschik | |
| 2003/0001005 A1 | 1/2003 | Risafi et al. | |
| 2003/0004802 A1 | 1/2003 | Callegari | |
| 2003/0004891 A1 | 1/2003 | Rensburg et al. | |
| 2003/0004894 A1 | 1/2003 | Rowney et al. | |
| 2003/0009382 A1 | 1/2003 | D'Arbeloff et al. | |
| 2003/0023552 A1 | 1/2003 | Kight et al. | |
| 2003/0028481 A1 | 2/2003 | Flitcroft et al. | |
| 2003/0033246 A1 | 2/2003 | Slater | |
| 2003/0055735 A1 | 3/2003 | Cameron et al. | |
| 2003/0055782 A1 | 3/2003 | Slater | |
| 2003/0070080 A1 | 4/2003 | Rosen | |
| 2003/0074328 A1 | 4/2003 | Schiff et al. | |
| 2003/0093366 A1 | 5/2003 | Halper et al. | |
| 2003/0105672 A1 | 6/2003 | Epstein et al. | |
| 2003/0105688 A1 | 6/2003 | Brown et al. | |
| 2003/0115126 A1 | 6/2003 | Pitroda | |
| 2003/0121967 A1 | 7/2003 | Goldberg et al. | |
| 2003/0126079 A1 | 7/2003 | Roberson et al. | |
| 2003/0141358 A1 | 7/2003 | Hudson et al. | |
| 2003/0162565 A1 | 8/2003 | Al-Khaja | |
| 2003/0163787 A1 | 8/2003 | Hay et al. | |
| 2003/0172039 A1 | 9/2003 | Guy et al. | |
| 2003/0191711 A1 | 10/2003 | Jamison et al. | |
| 2003/0197059 A1 | 10/2003 | Tidball et al. | |
| 2003/0200179 A1 | 10/2003 | Kwan | |
| 2003/0200184 A1 | 10/2003 | Dominguez et al. | |
| 2003/0212601 A1 | 11/2003 | Silva et al. | |
| 2003/0218062 A1 | 11/2003 | Noriega et al. | |
| 2003/0218066 A1 | 11/2003 | Fernandes et al. | |
| 2003/0220884 A1 | 11/2003 | Choi et al. | |
| 2003/0226042 A1 | 12/2003 | Fukushima | |
| 2003/0229590 A1 | 12/2003 | Byrne et al. | |
| 2003/0233317 A1 | 12/2003 | Judd | |
| 2003/0233318 A1 | 12/2003 | King et al. | |
| 2003/0234819 A1 | 12/2003 | Daly et al. | |
| 2003/0236704 A1 | 12/2003 | Antonucci | |
| 2004/0009760 A1 | 1/2004 | Laybourn et al. | |
| 2004/0010462 A1 | 1/2004 | Moon et al. | |
| 2004/0019564 A1 | 1/2004 | Goldthwaite et al. | |
| 2004/0019568 A1 | 1/2004 | Moenickheim et al. | |
| 2004/0029569 A1 | 2/2004 | Khan et al. | |
| 2004/0046035 A1 | 3/2004 | Davila et al. | |
| 2004/0049456 A1 | 3/2004 | Dreyer | |
| 2004/0049458 A1 | 3/2004 | Kunugi et al. | |
| 2004/0054587 A1 | 3/2004 | Dev et al. | |
| 2004/0059671 A1 | 3/2004 | Nozaki et al. | |
| 2004/0064409 A1 | 4/2004 | Kight et al. | |
| 2004/0068446 A1 | 4/2004 | Do et al. | |
| 2004/0068448 A1 | 4/2004 | Kim | |
| 2004/0078327 A1 | 4/2004 | Frazier et al. | |
| 2004/0078332 A1 | 4/2004 | Ferguson et al. | |
| 2004/0083170 A1 | 4/2004 | Bam et al. | |
| 2004/0083171 A1 | 4/2004 | Kight et al. | |
| 2004/0093305 A1 | 5/2004 | Kight et al. | |
| 2004/0094624 A1 | 5/2004 | Fernandes et al. | |
| 2004/0107170 A1 | 6/2004 | Labrou et al. | |
| 2004/0114766 A1 | 6/2004 | Hileman et al. | |
| 2004/0117302 A1 | 6/2004 | Weichert et al. | |
| 2004/0118914 A1 | 6/2004 | Smith et al. | |
| 2004/0128197 A1 | 7/2004 | Bam et al. | |
| 2004/0139005 A1 | 7/2004 | Ganesan | |
| 2004/0159700 A1 | 8/2004 | Khan et al. | |
| 2004/0162058 A1 | 8/2004 | Mottes | |
| 2004/0167853 A1 | 8/2004 | Sharma | |
| 2004/0181463 A1 | 9/2004 | Goldthwaite et al. | |
| 2004/0185881 A1 | 9/2004 | Lee et al. | |
| 2004/0199431 A1 | 10/2004 | Ganesan et al. | |
| 2004/0199474 A1 | 10/2004 | Ritter | |
| 2004/0205023 A1 | 10/2004 | Hafer et al. | |
| 2004/0205138 A1 | 10/2004 | Friedman et al. | |
| 2004/0210449 A1 | 10/2004 | Breck et al. | |
| 2004/0215560 A1 | 10/2004 | Amalraj et al. | |
| 2004/0215564 A1 | 10/2004 | Lawlor et al. | |
| 2004/0215573 A1 | 10/2004 | Teutenberg et al. | |
| 2004/0224660 A1 | 11/2004 | Anderson | |
| 2004/0225560 A1 | 11/2004 | Lewis et al. | |
| 2004/0230489 A1 | 11/2004 | Goldthwaite et al. | |
| 2004/0232225 A1 | 11/2004 | Bishop et al. | |
| 2004/0242208 A1 | 12/2004 | Teicher | |
| 2004/0243490 A1 | 12/2004 | Murto et al. | |
| 2004/0249710 A1 | 12/2004 | Smith et al. | |
| 2004/0249766 A1 | 12/2004 | Ganesan et al. | |
| 2004/0267663 A1 | 12/2004 | Karns et al. | |
| 2004/0267664 A1 | 12/2004 | Nam et al. | |
| 2004/0267665 A1 | 12/2004 | Nam et al. | |
| 2005/0001027 A1 | 1/2005 | Bahar | |

(56) References Cited

U.S. PATENT DOCUMENTS

| | | |
|---|---|---|
| 2005/0015388 A1 | 1/2005 | Dasgupta et al. |
| 2005/0021457 A1 | 1/2005 | Johnson et al. |
| 2005/0027624 A1 | 2/2005 | Cai |
| 2005/0027655 A1 | 2/2005 | Sharma et al. |
| 2005/0033645 A1 | 2/2005 | DuPhily |
| 2005/0051619 A1 | 3/2005 | Graves et al. |
| 2005/0060261 A1 | 3/2005 | Remington et al. |
| 2005/0061872 A1 | 3/2005 | Paschini et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0080727 A1 | 4/2005 | Postrel |
| 2005/0086164 A1 | 4/2005 | Kim et al. |
| 2005/0086168 A1 | 4/2005 | Alvarez et al. |
| 2005/0096981 A1 | 5/2005 | Shimada |
| 2005/0097038 A1 | 5/2005 | Yu et al. |
| 2005/0103839 A1 | 5/2005 | Hewel |
| 2005/0107068 A1 | 5/2005 | Smith et al. |
| 2005/0109835 A1 | 5/2005 | Jacoby et al. |
| 2005/0116028 A1 | 6/2005 | Cohen et al. |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0143051 A1 | 6/2005 | Park |
| 2005/0154644 A1 | 7/2005 | Deakin et al. |
| 2005/0174975 A1 | 8/2005 | Mgrdechian et al. |
| 2005/0177437 A1 | 8/2005 | Ferrier |
| 2005/0177517 A1 | 8/2005 | Leung et al. |
| 2005/0182714 A1 | 8/2005 | Nel |
| 2005/0182720 A1 | 8/2005 | Willard et al. |
| 2005/0184145 A1 | 8/2005 | Law et al. |
| 2005/0187873 A1 | 8/2005 | Labrou et al. |
| 2005/0199709 A1 | 9/2005 | Linlor |
| 2005/0203835 A1 | 9/2005 | Nhaissi et al. |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0228717 A1 | 10/2005 | Gusler et al. |
| 2005/0247777 A1 | 11/2005 | Pitroda |
| 2005/0259589 A1 | 11/2005 | Rozmovits et al. |
| 2005/0261968 A1 | 11/2005 | Randall et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004631 A1 | 1/2006 | Roberts et al. |
| 2006/0004656 A1 | 1/2006 | Lee |
| 2006/0006226 A1 | 1/2006 | Fitzgerald et al. |
| 2006/0023856 A1 | 2/2006 | Welton |
| 2006/0026070 A1 | 2/2006 | Sun |
| 2006/0037835 A1 | 2/2006 | Doran et al. |
| 2006/0041470 A1 | 2/2006 | Filho et al. |
| 2006/0053056 A1 | 3/2006 | Alspach-Goss et al. |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0113376 A1 | 6/2006 | Reed et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0161490 A1 | 7/2006 | Chakiris et al. |
| 2006/0163343 A1 | 7/2006 | Changryeol |
| 2006/0167744 A1 | 7/2006 | Yoo |
| 2006/0206436 A1 | 9/2006 | James et al. |
| 2006/0207856 A1 | 9/2006 | Dean et al. |
| 2006/0235754 A1 | 10/2006 | Walker et al. |
| 2006/0253320 A1 | 11/2006 | Heywood |
| 2006/0255125 A1 | 11/2006 | Jennings et al. |
| 2007/0017976 A1 | 1/2007 | Peyret et al. |
| 2007/0021969 A1 | 1/2007 | Homeier-Beals |
| 2007/0030824 A1 | 2/2007 | Ribaudo et al. |
| 2007/0038577 A1 | 2/2007 | Werner et al. |
| 2007/0043682 A1 | 2/2007 | Drapkin et al. |
| 2007/0055785 A1 | 3/2007 | Stevens |
| 2007/0063024 A1 | 3/2007 | Guillot |
| 2007/0100761 A1 | 5/2007 | Dillon |
| 2007/0108269 A1 | 5/2007 | Benco et al. |
| 2007/0114274 A1 | 5/2007 | Gibbs et al. |
| 2007/0118478 A1 | 5/2007 | Graves et al. |
| 2007/0125838 A1 | 6/2007 | Law et al. |
| 2007/0130085 A1 | 6/2007 | Zhu |
| 2007/0156436 A1 | 7/2007 | Fisher et al. |
| 2007/0162337 A1 | 7/2007 | Hawkins et al. |
| 2007/0175984 A1 | 8/2007 | Khandaker et al. |
| 2007/0192182 A1 | 8/2007 | Monaco et al. |
| 2007/0198347 A1 | 8/2007 | Muldoon |
| 2007/0208618 A1 | 9/2007 | Paintin et al. |
| 2007/0233615 A1 | 10/2007 | Tumminaro |
| 2007/0257767 A1 | 11/2007 | Beeson |
| 2007/0262140 A1 | 11/2007 | Long |
| 2007/0265872 A1 | 11/2007 | Robinson et al. |
| 2007/0284434 A1 | 12/2007 | Fletcher |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1 | 2/2008 | Rackley, III et al. |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0052169 A1 | 2/2008 | O'Shea et al. |
| 2008/0059318 A1 | 3/2008 | Packes et al. |
| 2008/0070690 A1 | 3/2008 | Luchene et al. |
| 2008/0071620 A1 | 3/2008 | Lowe |
| 2008/0078831 A1 | 4/2008 | Johnson et al. |
| 2008/0091545 A1 | 4/2008 | Jennings et al. |
| 2008/0097844 A1 | 4/2008 | Hsu et al. |
| 2008/0097851 A1 | 4/2008 | Bemmel et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0133351 A1 | 6/2008 | White et al. |
| 2008/0172306 A1 | 7/2008 | Schorr et al. |
| 2008/0172331 A1 | 7/2008 | Graves et al. |
| 2008/0179395 A1 | 7/2008 | Dixon et al. |
| 2008/0228597 A1 | 9/2008 | Sondles |
| 2008/0235095 A1 | 9/2008 | Oles et al. |
| 2008/0255942 A1 | 10/2008 | Craft |
| 2008/0273630 A1 | 11/2008 | Mege et al. |
| 2008/0290987 A1 | 11/2008 | Li |
| 2008/0319868 A1 | 12/2008 | Briscoe et al. |
| 2009/0001159 A1 | 1/2009 | James et al. |
| 2009/0006116 A1 | 1/2009 | Baker et al. |
| 2009/0030789 A1 | 1/2009 | Mashinsky |
| 2009/0037326 A1 | 2/2009 | Chitti et al. |
| 2009/0055296 A1 | 2/2009 | Nelsen |
| 2009/0076896 A1 | 3/2009 | DeWitt et al. |
| 2009/0106115 A1 | 4/2009 | James et al. |
| 2009/0111378 A1 | 4/2009 | Sheynman et al. |
| 2009/0112709 A1 | 4/2009 | Barhydt et al. |
| 2009/0144161 A1 | 6/2009 | Fisher |
| 2009/0157554 A1 | 6/2009 | Hobson et al. |
| 2009/0164329 A1 | 6/2009 | Bishop et al. |
| 2009/0171739 A1 | 7/2009 | De et al. |
| 2009/0171804 A1 | 7/2009 | Lee et al. |
| 2009/0173782 A1 | 7/2009 | Muscato |
| 2009/0173784 A1 | 7/2009 | Yang |
| 2009/0187491 A1 | 7/2009 | Bull et al. |

(56) References Cited

U.S. PATENT DOCUMENTS

| | | |
|---|---|---|
| 2009/0192904 A1 | 7/2009 | Patterson et al. |
| 2009/0192928 A1 | 7/2009 | Abifaker |
| 2009/0247131 A1 | 10/2009 | Champion et al. |
| 2009/0254453 A1 | 10/2009 | Sanguinetti et al. |
| 2009/0281915 A1 | 11/2009 | Deakin et al. |
| 2009/0281941 A1 | 11/2009 | Worth |
| 2009/0281951 A1 | 11/2009 | Shakkarwar |
| 2009/0287558 A1 | 11/2009 | Seth et al. |
| 2009/0298427 A1 | 12/2009 | Wilkinson et al. |
| 2009/0327121 A1 | 12/2009 | Carroll et al. |
| 2010/0005025 A1 | 1/2010 | Kumar et al. |
| 2010/0008535 A1 | 1/2010 | Abulafia et al. |
| 2010/0010906 A1 | 1/2010 | Grecia |
| 2010/0041368 A1 | 2/2010 | Kumar |
| 2010/0042471 A1 | 2/2010 | Chang et al. |
| 2010/0063906 A1 | 3/2010 | Nelsen et al. |
| 2010/0076833 A1 | 3/2010 | Nelsen |
| 2010/0082487 A1 | 4/2010 | Nelsen |
| 2010/0082490 A1 | 4/2010 | Rosenblatt et al. |
| 2010/0088188 A1 | 4/2010 | Kumar et al. |
| 2010/0097180 A1 | 4/2010 | Cardullo |
| 2010/0130172 A1 | 5/2010 | Vendrow et al. |
| 2010/0131415 A1 | 5/2010 | Sartipi |
| 2010/0174993 A1 | 7/2010 | Pennington et al. |
| 2010/0175287 A1 | 7/2010 | Gupta et al. |
| 2010/0185505 A1 | 7/2010 | Sprogoe et al. |
| 2010/0205063 A1 | 8/2010 | Mersky |
| 2010/0280921 A1 | 11/2010 | Stone et al. |
| 2010/0293536 A1 | 11/2010 | Nikitin et al. |
| 2010/0299194 A1 | 11/2010 | Snyder et al. |
| 2010/0299266 A1 | 11/2010 | Catania et al. |
| 2010/0304852 A1 | 12/2010 | Szrek et al. |
| 2011/0087592 A1 | 4/2011 | Veen et al. |
| 2011/0091092 A1 | 4/2011 | Nepomniachtchi et al. |
| 2011/0106698 A1 | 5/2011 | Isaacson et al. |
| 2011/0125607 A1 | 5/2011 | Wilen |
| 2011/0145044 A1 | 6/2011 | Nelsen et al. |
| 2011/0161226 A1 | 6/2011 | Courtion et al. |
| 2011/0173083 A1 | 7/2011 | Reed et al. |
| 2011/0202419 A1 | 8/2011 | Mamdani et al. |
| 2011/0234514 A1 | 9/2011 | Gothard |
| 2011/0246284 A1 | 10/2011 | Chaikin et al. |
| 2011/0251962 A1 | 10/2011 | Hruska |
| 2011/0266335 A1* | 11/2011 | Glowacki ............... B65D 5/425 229/103.2 |
| 2012/0004769 A1 | 1/2012 | Hallenbeck et al. |
| 2012/0099780 A1 | 4/2012 | Smith et al. |
| 2012/0136780 A1 | 5/2012 | El-Awady et al. |
| 2012/0203572 A1 | 8/2012 | Christensen |
| 2012/0209688 A1 | 8/2012 | Lamothe et al. |
| 2012/0234911 A1 | 9/2012 | Yankovich et al. |
| 2012/0271689 A1 | 10/2012 | Etheredge et al. |
| 2012/0284185 A1 | 11/2012 | Mettler et al. |
| 2013/0073388 A1 | 3/2013 | Heath |
| 2013/0290121 A1 | 10/2013 | Simakov et al. |
| 2013/0304561 A1 | 11/2013 | Warner et al. |
| 2014/0006268 A1 | 1/2014 | Roberts et al. |
| 2014/0019238 A1 | 1/2014 | Blatchley et al. |
| 2014/0027500 A1* | 1/2014 | Thorn .................. B65D 5/4233 229/116.5 |
| 2015/0278845 A1 | 10/2015 | Sorem et al. |
| 2017/0076293 A1 | 3/2017 | Cage et al. |

FOREIGN PATENT DOCUMENTS

| | | |
|---|---|---|
| EP | 2128809 A1 | 12/2009 |
| JP | 2002189963 A | 7/2002 |
| JP | 2002318951 A | 10/2002 |
| JP | 2003208541 A | 7/2003 |
| KR | 20010106187 A | 11/2001 |
| KR | 20040028487 A | 4/2004 |
| KR | 20040052531 A | 6/2004 |
| KR | 1020040052502 A | 6/2004 |
| KR | 20040069294 A | 8/2004 |
| KR | 20050118609 A | 12/2005 |
| KR | 20090123444 A | 12/2009 |
| WO | 2004012118 A1 | 2/2004 |
| WO | 2005111882 A1 | 11/2005 |
| WO | 2008005018 A9 | 1/2010 |
| WO | 2013078499 A1 | 6/2013 |

OTHER PUBLICATIONS

International Search Report of PCT/US 13/23945, dated Mar. 29, 2013; 2 pages.
ISA European Patent Office, Search Report of EP09812328.4, dated Jul. 4, 2012, Germany, 6 pages.
ISA Korea, International Search Report of PCT/US2009/056118, dated Apr. 19, 2010, 3 pages.
ISA Korea, International Search Report of PCT/US2009/058111, dated May 26, 2010, 3 pages.
ISA Korean Intellectual Property Office, International Search Report of PCT/US2010/060875, dated Jul. 29, 2011, 10 pages.
ISA United States Patent and Trademark Office, International Search Report of PCT/US2008/073910, dated Nov. 10, 2008.
Nelsen, David A., "Systems and Methods to Manage and Control Use of a Virtual Card," U.S. Appl. No. 13/158,349, filed Jun. 10, 2011, 62 pages.

* cited by examiner

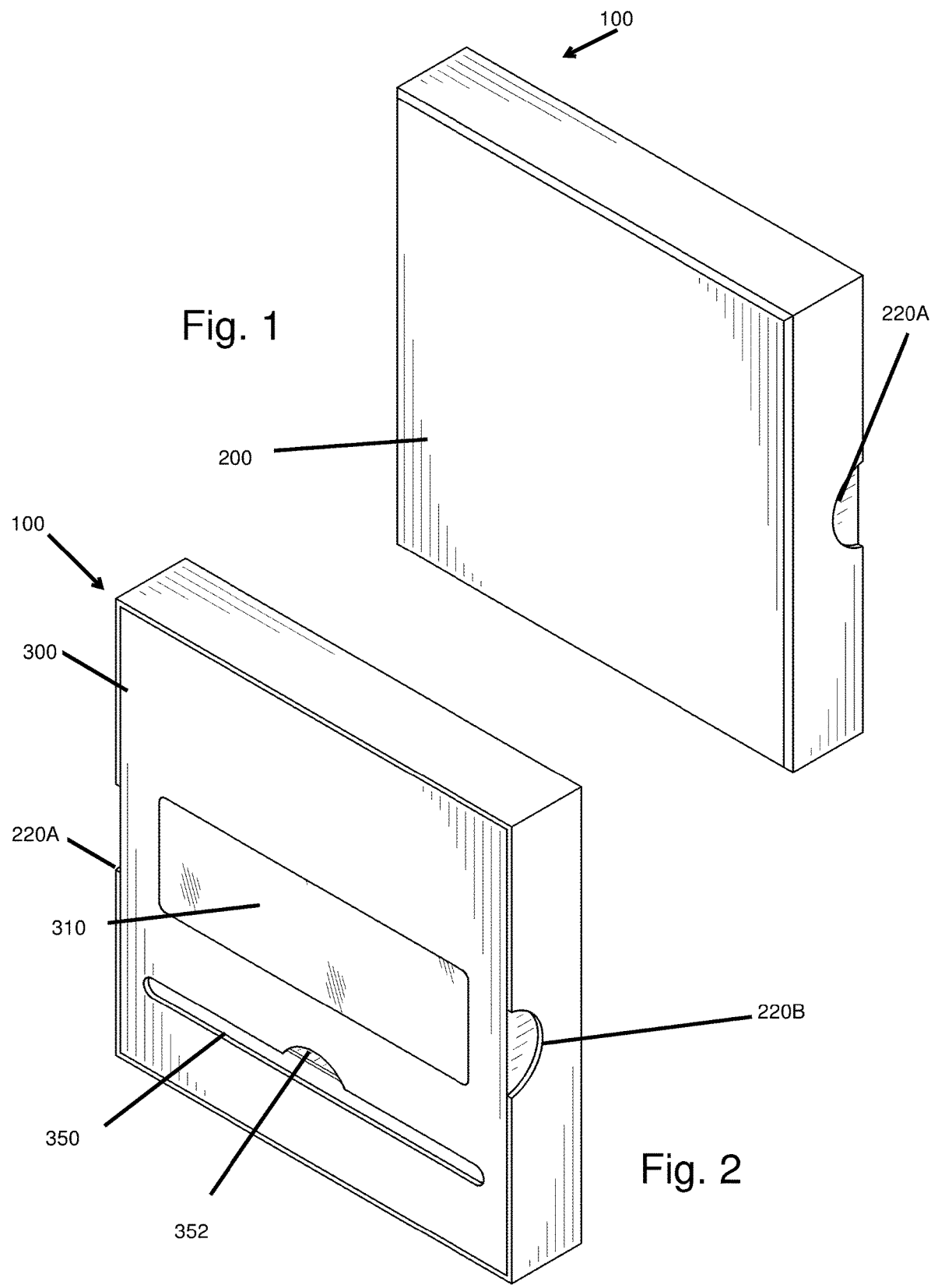

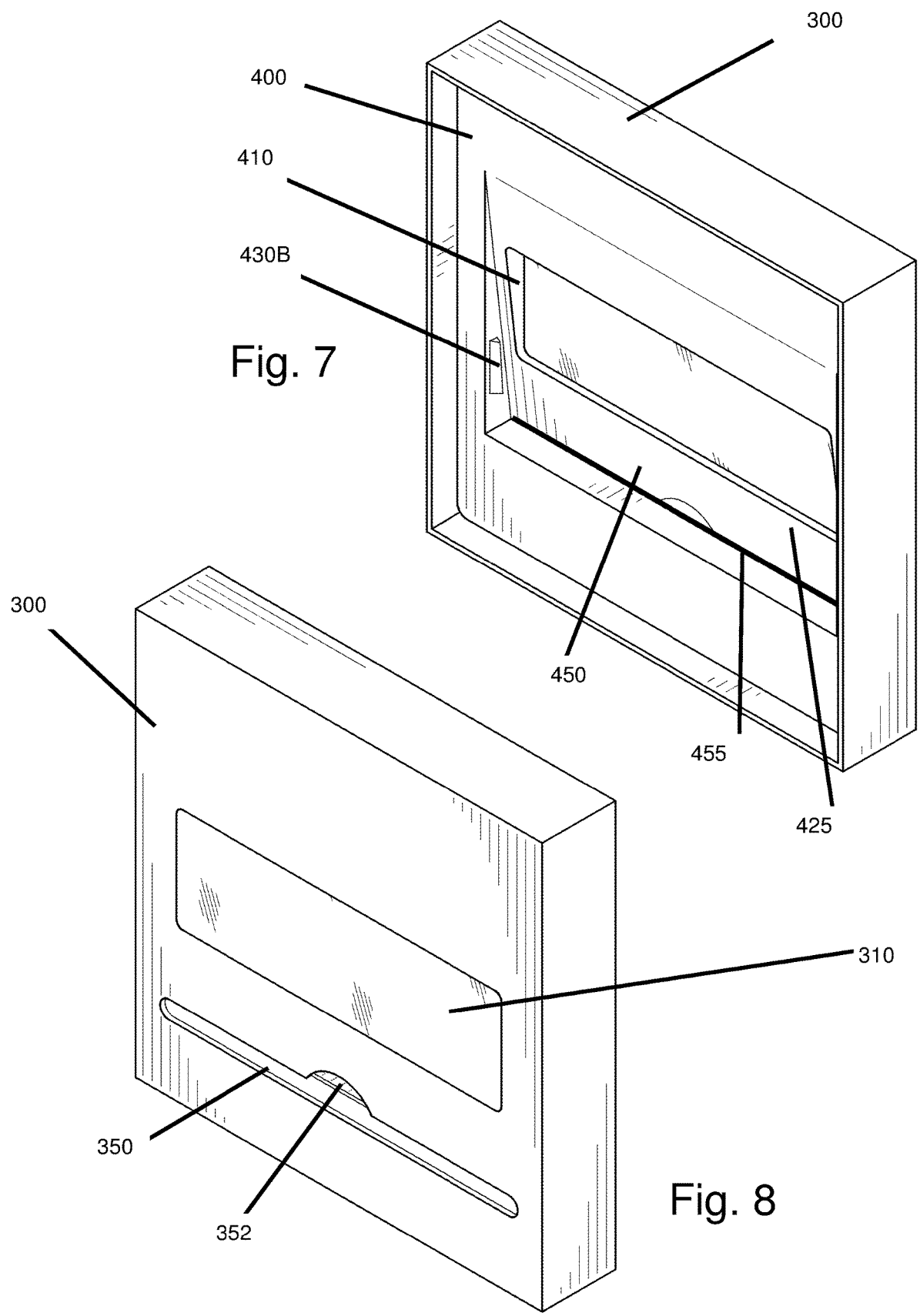

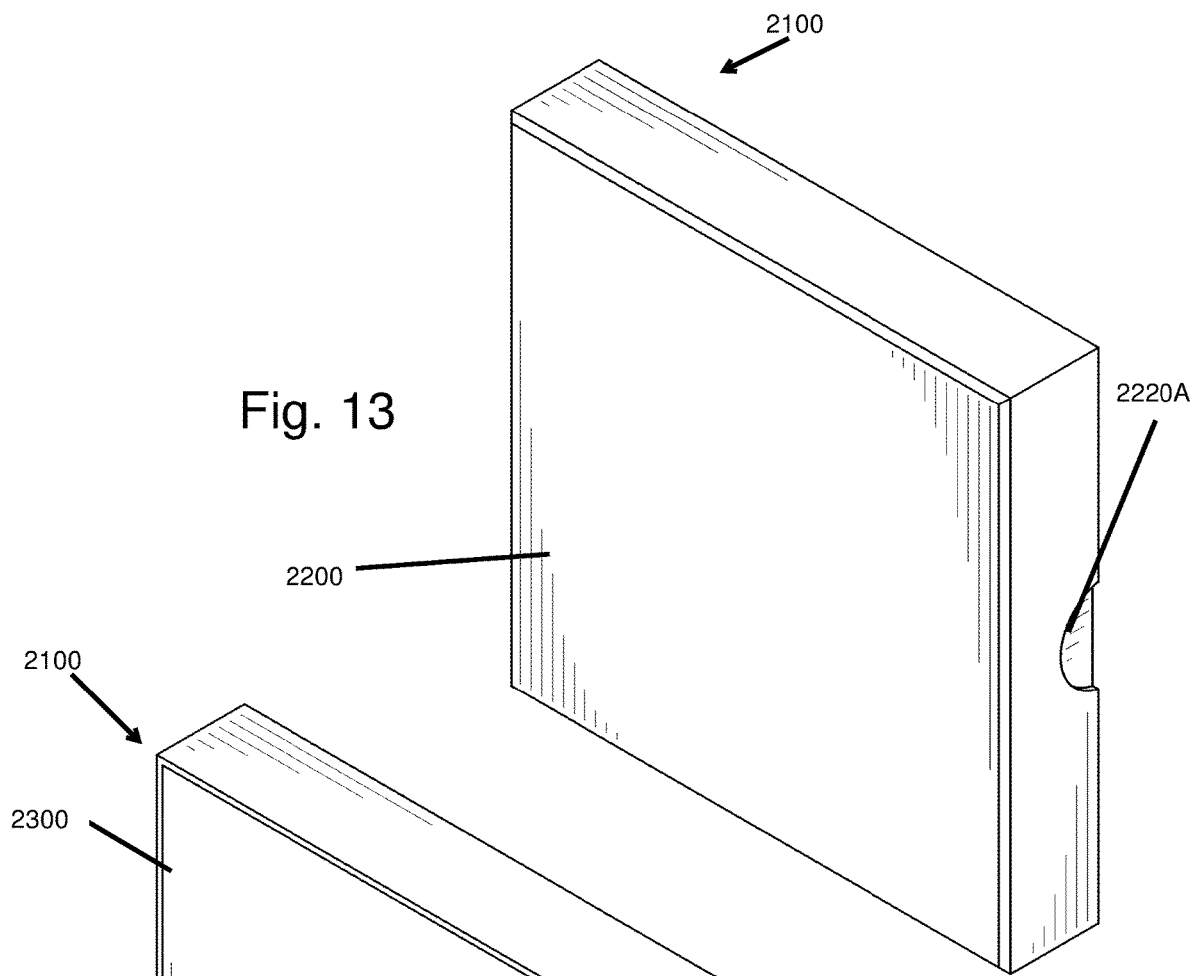
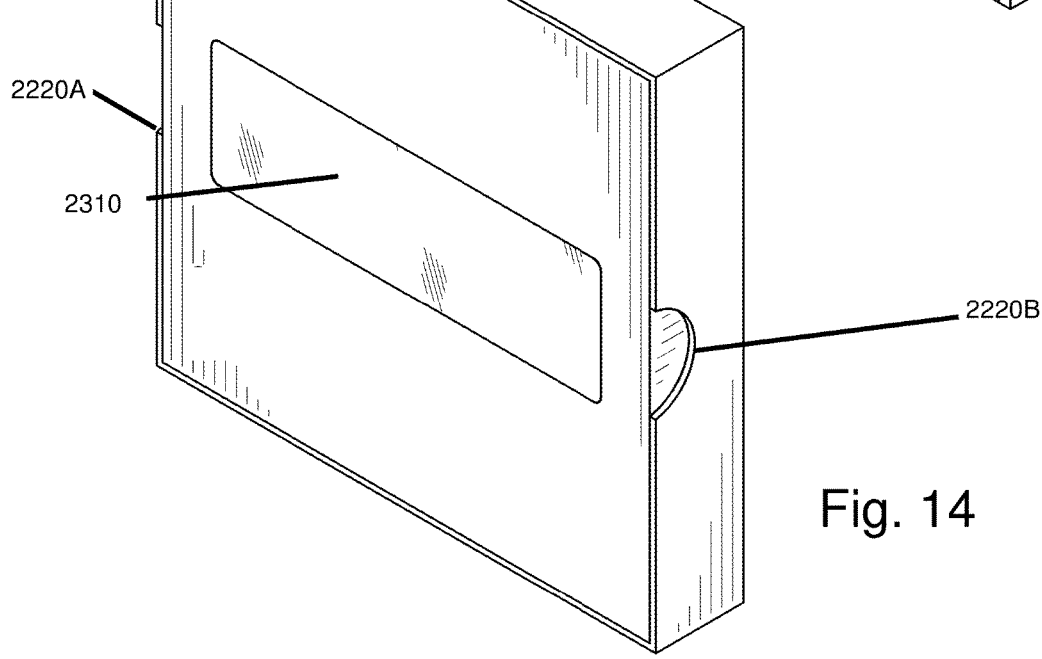

GIFT CARD BOX WITH SLANTED TRAY AND SLIT

CROSS-REFERENCE TO RELATED APPLICATION

This application claims the benefit of priority to U.S. Non-provisional application Ser. No. 15/431,535, entitled "Gift Card Presentation Devices," filed Feb. 13, 2017, which claims Ser. No. 14/181,668, entitled "Gift Card Presentation Devices," filed Feb. 15, 2014, which claims priority to U.S. Provisional Application No. 61/765,594, filed Feb. 15, 2013, entitled "Gift Card Presentation Devices," the entire contents of which are hereby incorporated herein by reference.

BACKGROUND

Transaction cards, stored value cards, or gift cards are popular gifts. Gift cards typically comprise a stored value card whereby a certain cash equivalent value is encoded upon a magnetic strip applied to the surface of the card. This stored value may be determined by the vendor prior to packaging and display for sale or may be selected at the point of sale by the purchaser and loaded by the cashier using a magnetic card reader/writer. Although popular, gift cards are typically provided with a generic and impersonal design. In addition, gift cards are often given in simple un-adorned envelopes or impersonal sleeves. This may minimize the gift giving experience and emotional value for both gift giver and the recipient.

Therefore, a need exists for a gift card holder that provides graphical and/or mechanical enhancements to entertain the gift card recipient and add emotional and personal value to the gift and the gift giver.

SUMMARY

This invention relates generally to gift card holders and more particularly to a device for holding a gift card or gift card packet while providing graphical and mechanical enhancements to entertain the gift card recipient and add value to the gift giving experience for the gift giver. In addition, the gift card holders are suitable for convenient display and activation by retailers. Specifically, the gift card holders include one or more cutouts that provide easy access to view and scan a barcode or other indicia on the gift cards for activation.

In one embodiment, the gift card holder is a box having a bottom portion with at least one cutout and a lid portion. The box also includes a tray positioned within the bottom portion. The tray receives a gift card and includes at least one cutout. such that all of the cutouts are aligned so that a barcode or other indicia on the gift card may be viewed when the box is closed.

In some embodiments the bottom portion of the box may have a bottom portion cutout for viewing a gift card held within the box. The bottom portion may also include a slit for receiving a gift card. The tray may also have a slit for receiving a gift card. Both slits may align with one another. The tray may additionally include a cutout for viewing the card.

Details of one or more implementations are set forth in the accompanying drawings and the description below. Other features and advantages may be apparent from the description and drawings, and from the claims.

BRIEF DESCRIPTION OF THE DRAWINGS

FIG. 1 is a front perspective plan view a of a gift box gift card holder according to one embodiment.

FIG. 2 is a rear perspective plan view, respectively, of a gift box gift card holder according to one embodiment.

FIG. 7 is a front perspective plan view a of a gift box gift card holder with the lid removed according to one embodiment.

FIG. 8 is a rear perspective plan view a of a gift box gift card holder with the lid removed according to one embodiment.

FIG. 13 is a front perspective plan view a of a gift box gift card holder according to one embodiment.

FIG. 14 is a rear perspective plan view, respectively, of a gift box gift card holder according to one embodiment.

DETAILED DESCRIPTION

Figure 3:
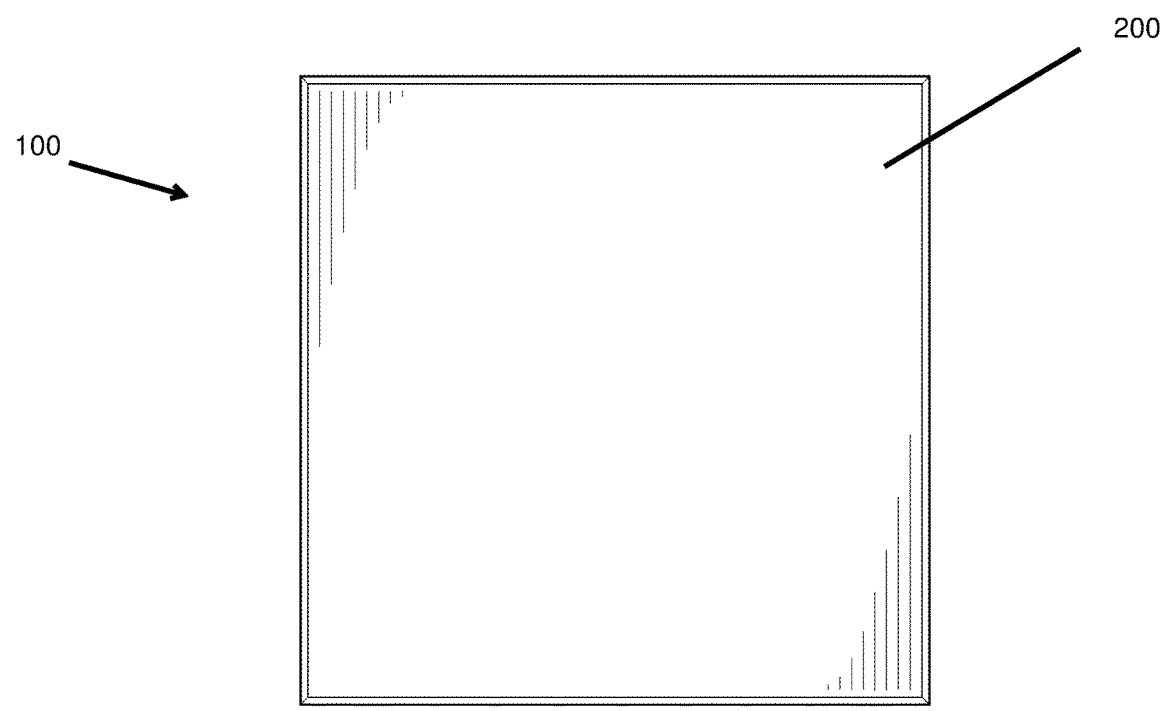
FIG. 3 is a front plan view of a gift box gift card holder according to one embodiment.
Figure 4:
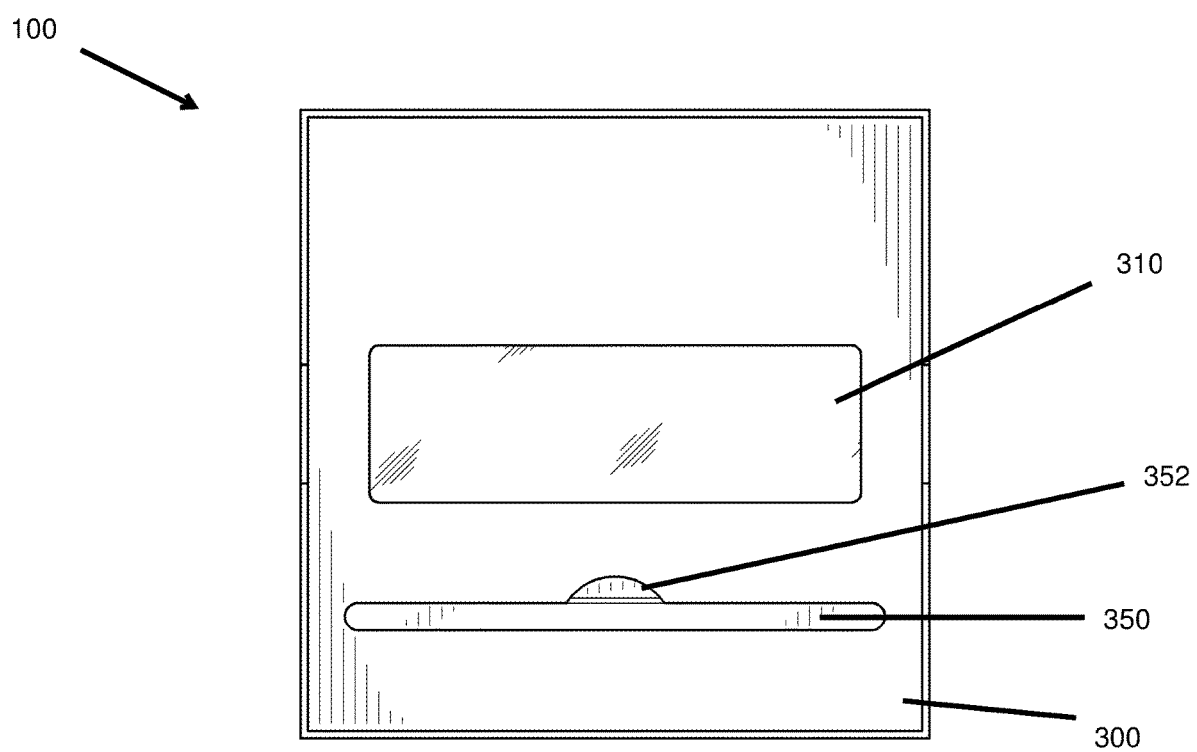
FIG. 4 is a rear plan view of a gift box gift card holder according to one embodiment.
Figure 5:
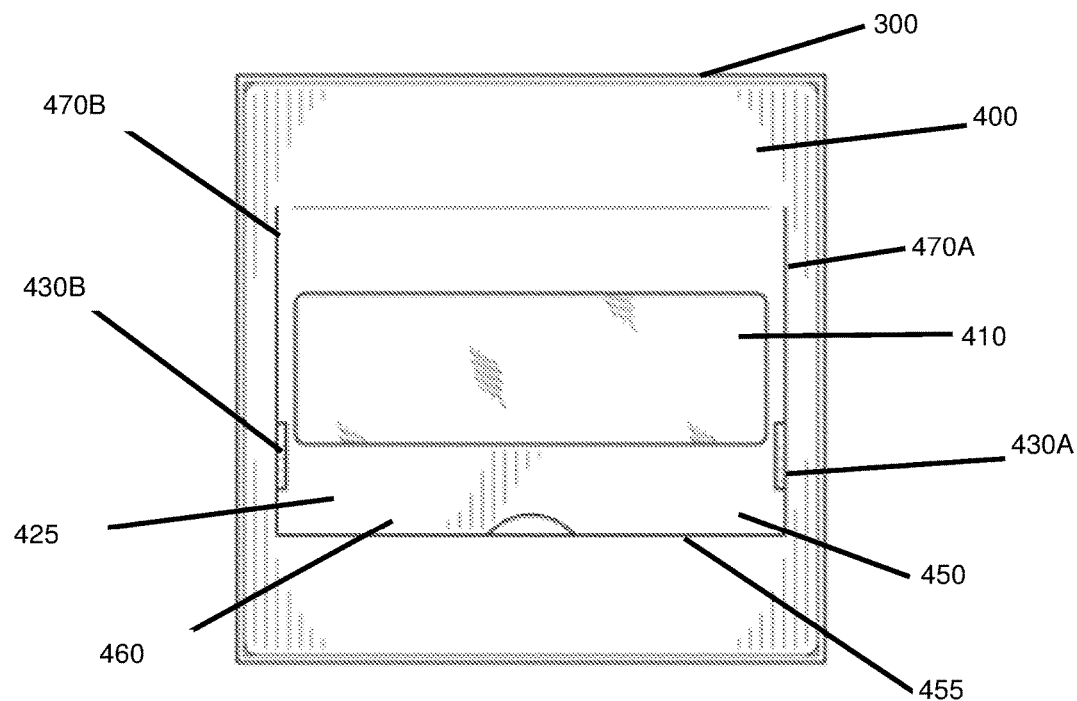
FIG. 5 is a front plan view of a gift box gift card holder with the lid removed according to one embodiment.
Figure 6:
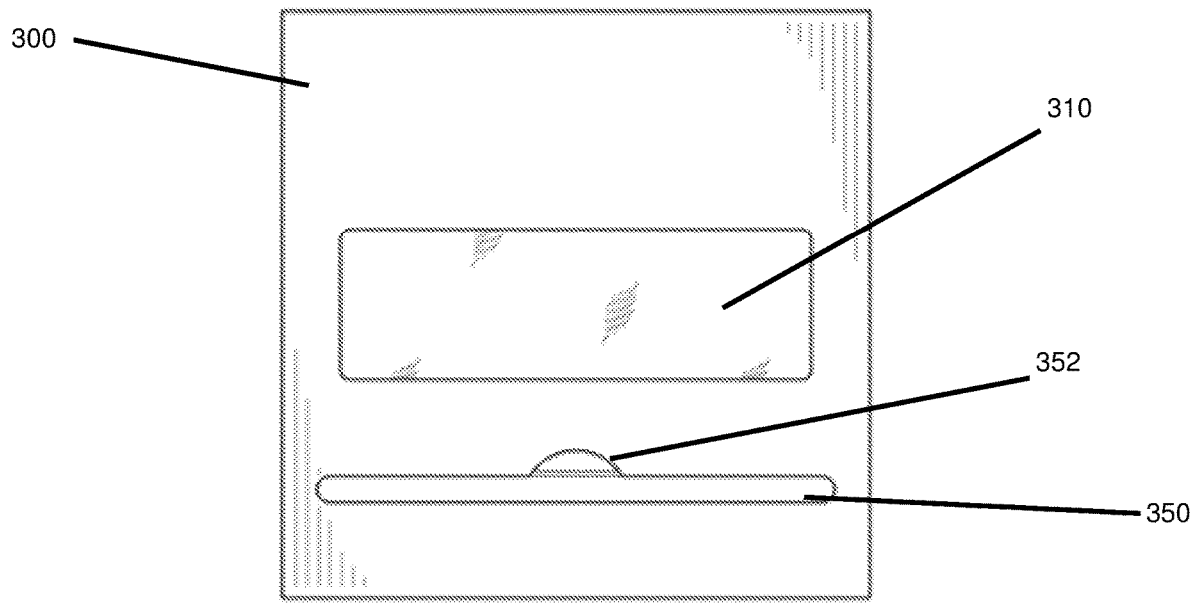
FIG. 6 is a rear plan view of a gift box gift card holder with the lid removed according to one embodiment.
Figures 9, 10:
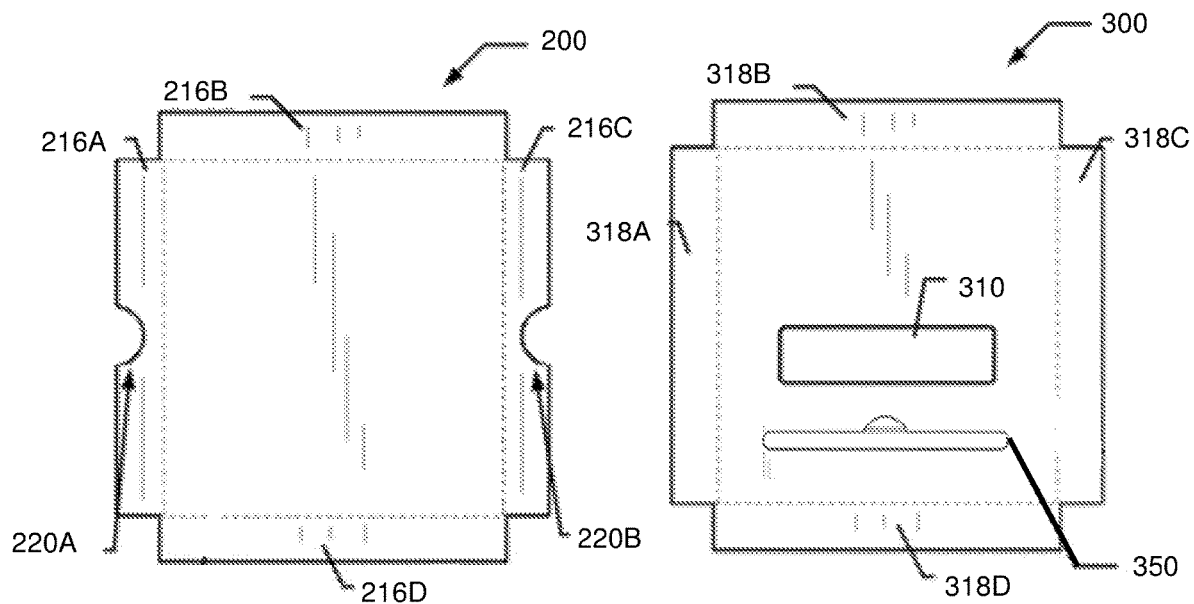
FIG. 9 is a plan view of an unassembled lid of a gift box gift card holder according to one embodiment.
FIG. 10 is a plan view of an unassembled bottom of a gift box gift card holder according to one embodiment.

The present invention relates to gift card holders that enhance the gift giving experience for both the gift giver and the gift recipient. The gift card holders disclosed herein also provide benefits to retailers. For example, the gift cards and gift card holders may be received by retailers in pre-assembled packaging. In addition, gift card holders allow the gift cards to be purchased and activated without removing them from the gift card holders. In various aspects, the gift card holders of the present invention include a number of decorative and functional features that allow a gift giver to add personalization and other enhancements when giving a gift card.

FIGS. 1-10 depict an embodiment of a gift box gift card holder 100. In this embodiment, the gift box gift card holder 100 is generally box shaped with a bottom portion 300 and a lid portion 200. The bottom potion 300 and lid portion 200 may be engaged to decorative covers, which include graphics or indicia. In one embodiment, the graphics and indicia may be applied directly to the bottom portion 300 and the lid portion 200. The holder 100 may also include a tray 400 within the box to hold and display a gift cart placed or attached thereon.

The bottom portion 300 and a lid portion 200 are fabricated from a planar material that is cut and scored to define a respective bottom panel 330 including a bottom portion cutout 310 and a top panel 440. Each portion 200 and 300 also includes sidewalls 216A-D and 318A-D, respectively, which are formed from the planar material. The sidewalls 216A-D and 318A-D may be folded inward to provide structure to the box. In one aspect, sidewalls 216A and 216C include notches 220A-B to grip and remove the lid portion 200 from the bottom portion 300 after assembly.

The tray 400 may be formed from a planar material that is cut and folded to fit with in the bottom portion 300. The tray 400 may also be formed by vacuum forming a thermoplastic material. The tray 400 includes a central portion 450 that is proximal to the bottom portion 300 of holder 100, when the tray is assembled.

The central portion 450 of the tray 400 may have a first sidewall 460 and a second and third side wall 470A and 470B. The second and third sidewalls 470A and 470B are opposite one another and parallel to one another. Both the second and third sidewalls may be perpendicular to the first sidewall 460. The sidewalls are connected to one another by a central portion surface 425. In various embodiments the central portion 450 may also include a fourth sidewall opposite the first sidewall 460. The central portion may be slanted with the lowest point of the central portion being adjacent to the first sidewall 460. The lowest point of the central portion 450 may have a slit 455 that aligns with the bottom portion's slit 350. The second and third side wall may have protrusions 430A and 430B configured to retain a transaction card that is held within the central portion 450. The tabs 430A and 430B may be at any point along the second and third sidewalls 470A and 470B. In this regard, a transaction card may be placed in the box by sliding the card through the bottom portion's slit 350 and the tray slit 455 so that the card rests on the central portion surface 425 between the tabs 430A and 430B. In some embodiments the bottom portion's slit 350 may include a finger notch 352 that aids a user in sliding a card into the box through the bottom portion's slit 350.

In one embodiment, the tray 400 is adhered to the interior surface of the bottom portion 300. The central portion 450 of the tray 400 also defines a cutout or opening 410 that is aligned with the bottom portion cutout 310 to allow a barcode or other indicia on the gift card to be viewed and scanned without removing the card from the box 100. In various aspects, the tray 400 includes markings and indicia that may correspond to the gift giving occasion, holiday, or season.

Figure 11:
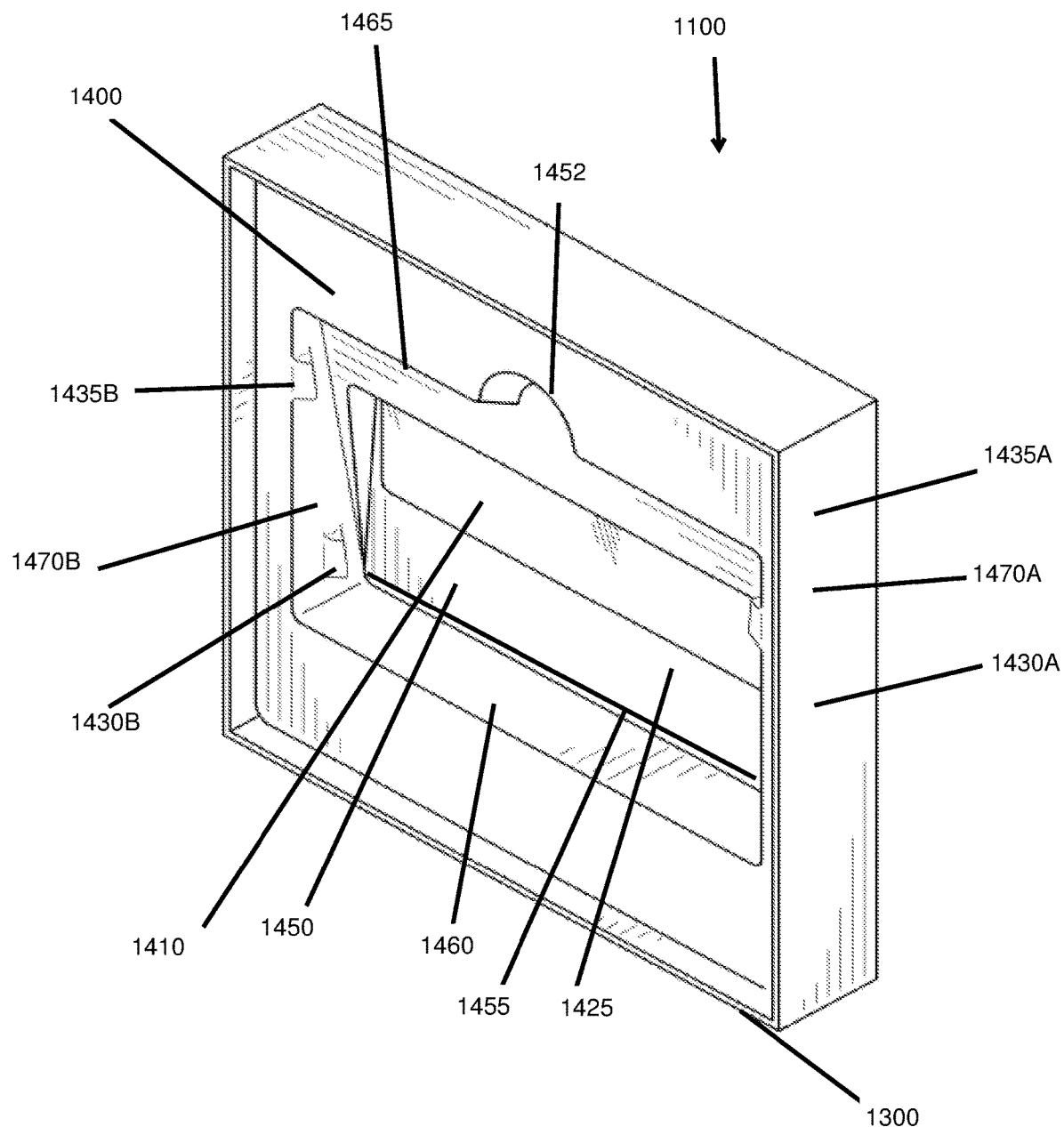
FIG. 11 is a front perspective plan view a of a gift box gift card holder with the lid removed according to a second embodiment.
Figure 12:
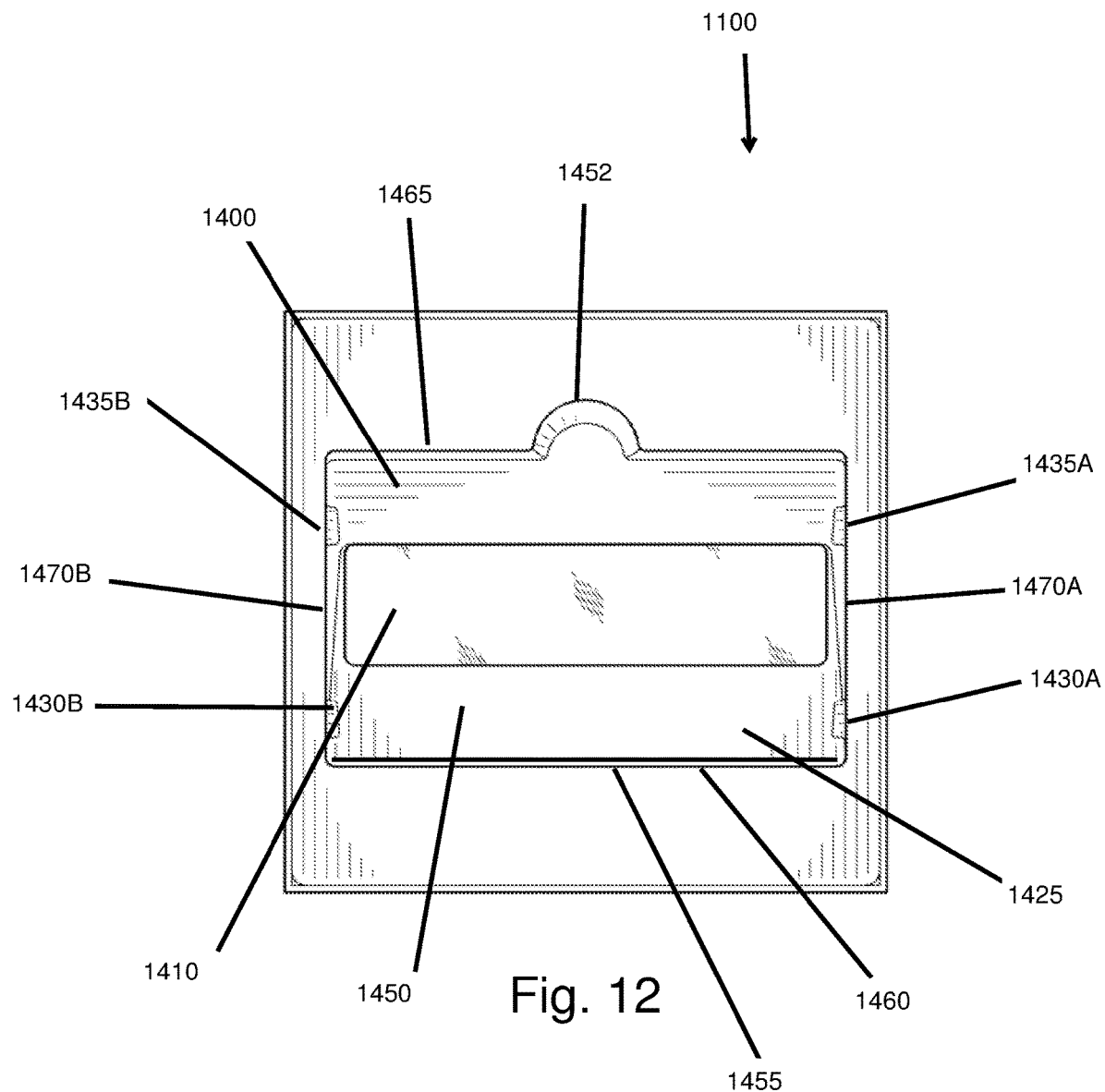
FIG. 12 is a plan view a of a gift box gift card holder with the lid removed according to a second embodiment.
Figure 15:
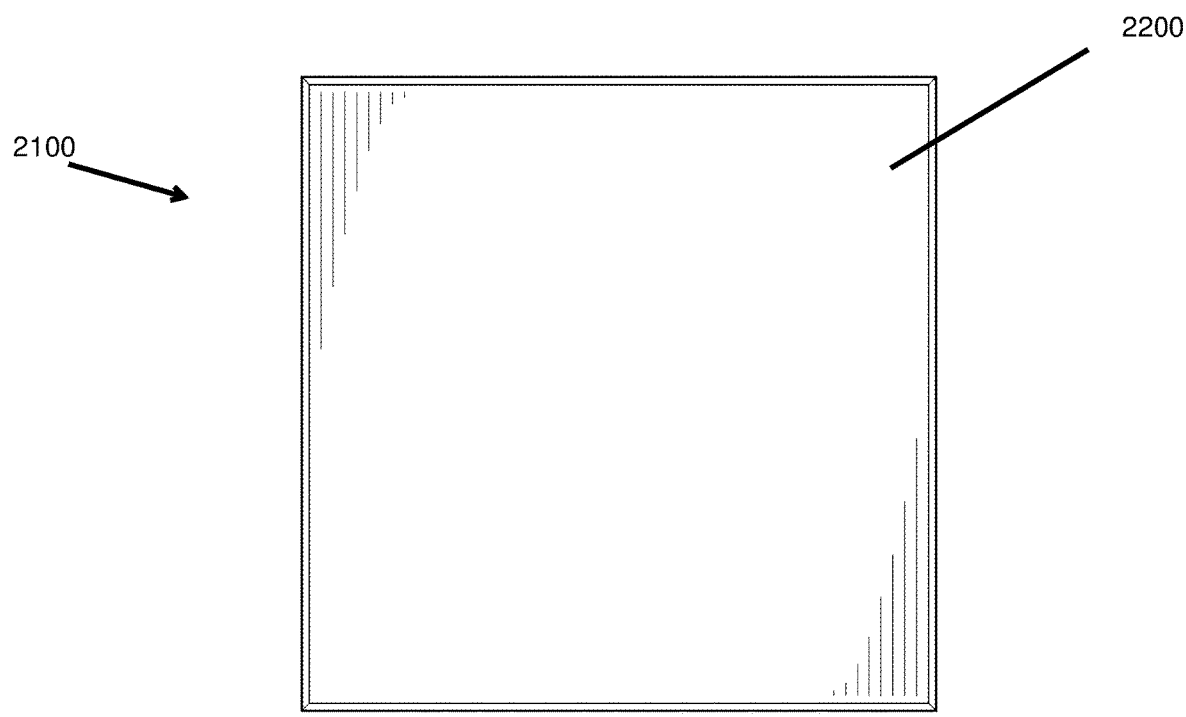
FIG. 15 is a front plan view of a gift box gift card holder according to one embodiment.
Figure 16:
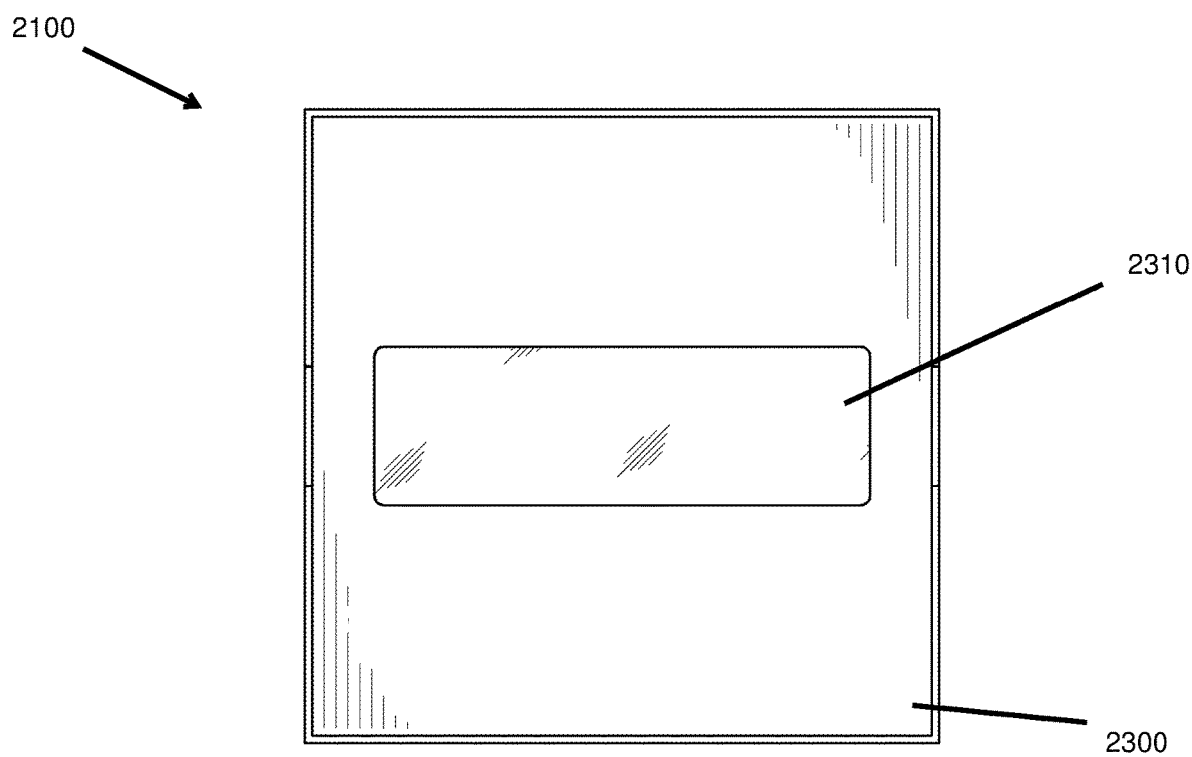
FIG. 16 is a rear plan view of a gift box gift card holder according to one embodiment.
Figures 17, 18:
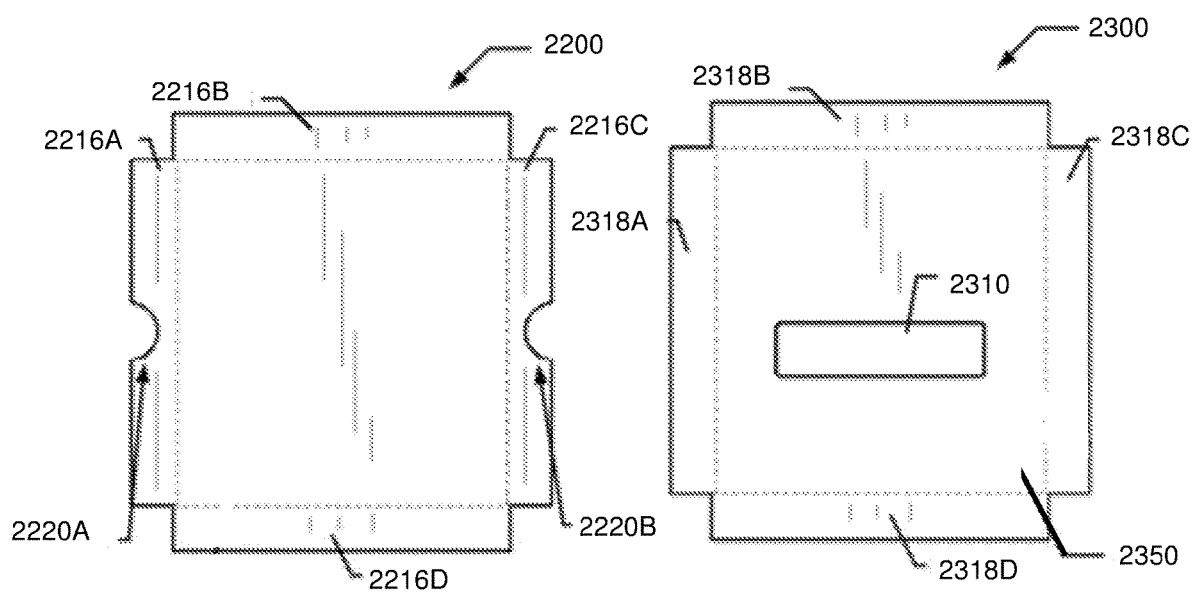
FIG. 17 is a plan view of an unassembled lid of a gift box gift card holder according to one embodiment.
FIG. 18 is a plan view of an unassembled bottom of a gift box gift card holder according to one embodiment.

FIGS. 11-12 depict another embodiment of a gift box gift card holder 1100. In this embodiment, the gift box gift card holder 1100 is generally box shaped with a bottom portion 1300 and a lid portion. The bottom potion 1300 and lid portion may be engaged to decorative covers, which include graphics or indicia. In one embodiment, the graphics and indicia may be applied directly to the bottom portion 1300 and the lid portion. The holder 1100 may also include a tray 1400 within the box to hold and display a gift cart placed or attached thereon. The central portion 1450 of the tray 1400 also defines a cutout or opening 1410 that is aligned with the bottom portion cutout 310 to allow a barcode or other indicia on the gift card to be viewed and scanned without removing the card from the box 100.

The central portion 1450 of the tray 1400 may have a first sidewall 1460 opposite a fourth side wall 1465 and a second and third side wall 1470A and 1470B. The first and fourth sidewall, 1460 and 1465 may be parallel to one another and generally perpendicular to the second and third side wall 1470A and 1470B. The second and third sidewalls 1470A and 1470B are opposite one another and parallel to one another. Both the second and third sidewalls may be perpendicular to the first sidewall 1460. The sidewalls are connected to one another by a central portion surface 1425. The central portion may be slanted with the lowest point of the central portion being adjacent to the first sidewall 1460. The lowest point of the central portion 1450 may have a tray slit 1455 that aligns with the bottom portion's slit 350. The second and third sidewalls 1470A and 1470B may have protrusions 1430A, 1430B, 1435A, and 1435B configured to retain a transaction card that is held within the central portion 1450. The tabs 1430A, 1430B, 1435A, and 1435B may be at any point along the second and third sidewalls 1470A and 1470B. In this regard, a transaction card may be placed in the box by sliding the card through the bottom portion's slit 350 and the tray slit 1455 so that the card rests on the central portion surface 1425 between the tabs 1430A, 1430B, 1435A, and 1435B. The fourth sidewall 1465 may have a finger notch 1452 located along the sidewall's edge. The finger notch 1452 may aid a user in removing a transaction card from the central portion 1450.

FIGS. 13-14 depict an embodiment of a gift box gift card holder 2100. In this embodiment, the gift box gift card holder 2100 is generally box shaped with a bottom portion 2300 and a lid portion 2200. The bottom potion 2300 and lid portion 2200 may be engaged to decorative covers, which include graphics or indicia. In one embodiment, the graphics and indicia may be applied directly to the bottom portion 2300 and the lid portion 2200. The holder 2100 may also include a tray 2400 within the box to hold and display a gift cart placed or attached thereon.

The bottom portion 2300 and a lid portion 2200 are fabricated from a planar material that is cut and scored to define a respective bottom panel 2330 including a bottom portion cutout 2310 and a top panel 2440. Each portion 2200 and 2300 also includes sidewalls 2216A-D and 2318A-D, respectively, which are formed from the planar material. The sidewalls 2216A-D and 2318A-D may be folded inward to provide structure to the box. In one aspect, sidewalls 2216A and 2216C include notches 2220A-B to grip and remove the lid portion 2200 from the bottom portion 2300 after assembly.

The tray 2400 may be formed from a planar material that is cut and folded to fit with in the bottom portion 2300. The tray 2400 may also be formed by vacuum forming a thermoplastic material. The tray 2400 includes a central portion 2450 that is proximal to the bottom portion 300 of holder 2100, when the tray is assembled.

The central portion 2450 of the tray 2400 may have a first sidewall 2460 and a second and third side wall 2470A and 2470B. The second and third sidewalls 2470A and 2470B are opposite one another and parallel to one another. Both the second and third sidewalls may be perpendicular to the first sidewall 2460. The sidewalls are connected to one another by a central portion surface 2425. In various embodiments the central portion 2450 may also include a fourth sidewall opposite the first sidewall 2460. The central portion may be slanted with the lowest point of the central portion being adjacent to the first sidewall 2460. The second and third side wall may have protrusions 2430A and 2430B configured to retain a transaction card that is held within the central portion 2450. The tabs 2430A and 2430B may be at any point along the second and third sidewalls 2470A and 2470B. In this regard, a transaction card may be placed in the box by pressing a transaction card into the central portion so that the card rests on the central portion surface 2425 between the tabs 2430A and 2430B.

In one embodiment, the tray 2400 is adhered to the interior surface of the bottom portion 2300. The central portion 2450 of the tray 2400 also defines a cutout or opening 2410 that is aligned with the bottom portion cutout 2310 to allow a barcode or other indicia on the gift card to be viewed and scanned without removing the card from the box 2100. In various aspects, the tray 2400 includes markings and indicia that may correspond to the gift giving occasion, holiday, or season.

For each embodiment, a gift card may be included with the gift card holders 100, 1100, and 2100. In various other embodiments, the gift card holders 100, 1100, and 2100 may be used or re-used with any gift card, including those purchased separately from the purchase of the gift card holder.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for holding a gift card comprising:
   a gift card;
   a box having a bottom portion with at least one slit and at least one bottom portion cutout, and a lid portion, wherein the lid portion is removable from the bottom portion after assembly;
   a tray positioned within the bottom portion, the tray receiving the gift card and including at least one tray portion slit, at least one tray portion cutout, and at least one tab retaining the gift card within the central portion of the tray and resting on a surface of the central portion, the retained gift card aligned with the at least one bottom portion cutout; and
   wherein a portion of the gift card received in the device is accessible through the at least one bottom portion cutout and the at least one tray portion cutout.

2. The system of claim 1, wherein a central portion of the tray contacts a surface of the bottom portion.

3. The system of claim 1, further comprising one or more decorative liners to cover an exterior of the bottom portion and the lid portion, wherein the decorative liner includes at least one liner cutout and at least one liner slit, wherein the at least one bottom portion cutout, tray portion cutout, and liner cutouts are aligned, and wherein the at least one bottom portion slit, tray portion slit, and liner portion slit are aligned.

4. The system of claim 3, wherein the portion of the gift card received in the device is accessible through the at least one bottom portion cutout, the at least one tray portion cutout, and the at least one liner cutout.

5. The system of claim 1, further comprising one or more notches to grip and remove the lid portion from the bottom portion.

6. The system of claim 1, further comprising one or more finger notches to aid in the receiving of the gift card.

7. A system for holding a gift card comprising:
   a gift card;
   a box having a base with at least one bottom portion cutout and at least one bottom portion slit;
   a lid portion, wherein the lid portion is removable from the base after assembly;
   a tray positioned within the box, the tray receiving the gift card and including at least one tray portion cutout, at least one tray portion slit, and at least one tab retaining the gift card within the central portion of the tray and resting on a surface of the central portion, the gift card retained aligned with the at least one bottom portion cutout;
   wherein a portion of the gift card received in the device is accessible through the at least one bottom portion cutout and the at least one tray portion cutout, and
   wherein both slits allow a card to be slid into the box.

8. The system of claim 7, wherein a central portion of tray contacts a surface of the base.

9. The system of claim 7, further comprising one or more decorative liners to cover an exterior of the box, wherein the decorative liner includes at least one liner cutout, wherein the at least one bottom portion, tray, and liner cutouts are aligned.

10. The system of claim 9, wherein the portion of the gift card received in the device is accessible through the at least one bottom portion cutout, the at least one tray portion cutout, and the at least one liner cutout.

11. The system of claim 7, further comprising one or more notches to grip and remove the lid portion from the base.

12. The system of claim 7, further comprising one or more finger notches to aid in the receiving of the gift card.

13. A method of displaying a gift card comprising:
    providing a box having a bottom portion with at least one bottom portion cutout, at least one bottom portion slit, and a lid portion,
    wherein the lid portion is removable from the bottom portion after assembly;
    a tray positioned within the bottom portion, the tray receiving the gift card and including at least one tray portion cutout, at least one tray portion slit, and at least one tab retaining the gift card within the central portion of the tray and resting on a surface of the central portion, the gift card retained aligned with the at least one bottom portion cutout;
    sliding a gift card through at least one slit so that a portion of the gift card received in the device is accessible through the at least one bottom portion cutout and the at least one tray portion cutout.

14. The method of claim 13, wherein the box further comprising one or more notches to grip and remove the lid portion from the bottom portion.

15. The method of claim 13, wherein the box further comprises one or more finger notches to aid in the receiving of the gift card.

16. The method of claim 13, wherein the box further comprises one or more decorative liners to cover an exterior of the bottom portion and the lid portion, wherein the decorative liner includes at least one liner cutout and at least one liner slit, wherein the at least one bottom portion cutout, tray portion cutout, and liner cutouts are aligned, and wherein the at least one bottom portion slit, tray portion slit, and liner portion slit are aligned.

17. A system for holding a gift card comprising:
a gift card;
a box having a base with at least one bottom portion cutout;
a lid portion, wherein the lid portion is removable from the base after assembly;
a tray positioned within the box, the tray receiving the gift card and including at least one tray portion cutout and at least one tab retaining the gift card within the central portion of the tray and resting on a surface of the central portion, the gift card retained aligned with the at least one bottom portion cutout;
wherein a portion of the gift card received in the device is accessible through the at least one bottom portion cutout and the at least one tray portion cutout.

18. The system of claim 17, further comprising one or more notches to grip and remove the lid portion from the bottom portion.

19. The system of claim 17, further comprising one or more finger notches to aid in the receiving of the gift card.

20. The system of claim 17, wherein a central portion of the tray contacts a surface of the base.

* * * * *